United States Patent
Wesenberg et al.

(10) Patent No.: US 9,893,672 B2
(45) Date of Patent: Feb. 13, 2018

(54) METHOD AND DEVICE FOR TEMPERATURE-DEPENDENT CONTROL OF AN ELECTRIC MOTOR

(71) Applicant: Audi AG, Ingolstadt (DE)

(72) Inventors: André Wesenberg, Freising (DE); Mirko Reuter, Dachau (DE)

(73) Assignee: AUDI AG, Ingolstadt (DE)

( * ) Notice: Subject to any disclaimer, the term of this patent is extended or adjusted under 35 U.S.C. 154(b) by 18 days.

(21) Appl. No.: 14/365,429

(22) PCT Filed: Nov. 24, 2012

(86) PCT No.: PCT/EP2012/004871
§ 371 (c)(1),
(2) Date: Jun. 13, 2014

(87) PCT Pub. No.: WO2013/087150
PCT Pub. Date: Jun. 20, 2013

(65) Prior Publication Data
US 2014/0350762 A1    Nov. 27, 2014

(30) Foreign Application Priority Data

Dec. 15, 2011   (DE) .......... 10 2011 121 272

(51) Int. Cl.
*B60L 9/00* (2006.01)
*B60L 11/00* (2006.01)
(Continued)

(52) U.S. Cl.
CPC ........ *H02P 29/0044* (2013.01); *B62D 5/0496* (2013.01); *G01K 1/20* (2013.01); *H02P 29/60* (2016.02); *G01K 2205/00* (2013.01)

(58) Field of Classification Search
CPC .................................................. H02P 29/0044
(Continued)

(56) References Cited

U.S. PATENT DOCUMENTS

2002/0014877 A1\*  2/2002  Kaji ............... B62D 5/0496
                                                 318/783
2003/0141767 A1    7/2003  Roepke et al.
(Continued)

FOREIGN PATENT DOCUMENTS

DE          102 03 051         8/2003
DE     10 2004 043 059 A1      3/2006
(Continued)

OTHER PUBLICATIONS

International Search Report issued by the European Patent Office in International Application PCT/EP2012/004871.

*Primary Examiner* — Imran Mustafa
(74) *Attorney, Agent, or Firm* — Henry M. Feiereisen LLC

(57) ABSTRACT

An apparatus for temperature-dependent control of an electric motor includes a control device for adjusting the power output of the electric motor, and means for detecting the temperature of a component of the electric motor, wherein the control device reduces the power of the electric motor in the case of a component temperature above a temperature threshold, and wherein the temperature detection means distinguish between self-heating and external heating, wherein the control device counteracts only the self-heating by reducing the power.

10 Claims, 1 Drawing Sheet

(51) Int. Cl.
  G05D 1/00 (2006.01)
  G05D 3/00 (2006.01)
  G06F 7/00 (2006.01)
  G06F 17/00 (2006.01)
  H02P 29/00 (2016.01)
  G01K 1/20 (2006.01)
  B62D 5/04 (2006.01)
  H02P 29/60 (2016.01)

(58) Field of Classification Search
  USPC ............................................................ 701/22
  See application file for complete search history.

(56) References Cited

U.S. PATENT DOCUMENTS

| | | | |
|---|---|---|---|
| 2006/0050768 | A1 | 3/2006 | Kriwan et al. |
| 2007/0247766 | A1* | 10/2007 | Zeniya ................ B62D 5/0463 361/25 |
| 2009/0065273 | A1* | 3/2009 | Wyatt ........................ B60L 3/00 180/65.8 |
| 2009/0189561 | A1 | 7/2009 | Patel et al. |
| 2010/0067560 | A1* | 3/2010 | Kouda ..................... F01P 11/16 374/145 |
| 2011/0279074 | A1 | 11/2011 | Yeh et al. |

FOREIGN PATENT DOCUMENTS

| | | |
|---|---|---|
| DE | 10 2004 062 655 | 7/2006 |
| DE | 10 2005 050 741 | 4/2007 |
| DE | 10 2005 052 745 | 5/2007 |
| DE | 10 2011 010 224 A1 | 8/2012 |
| JP | 2000166289 A * | 6/2000 |

* cited by examiner

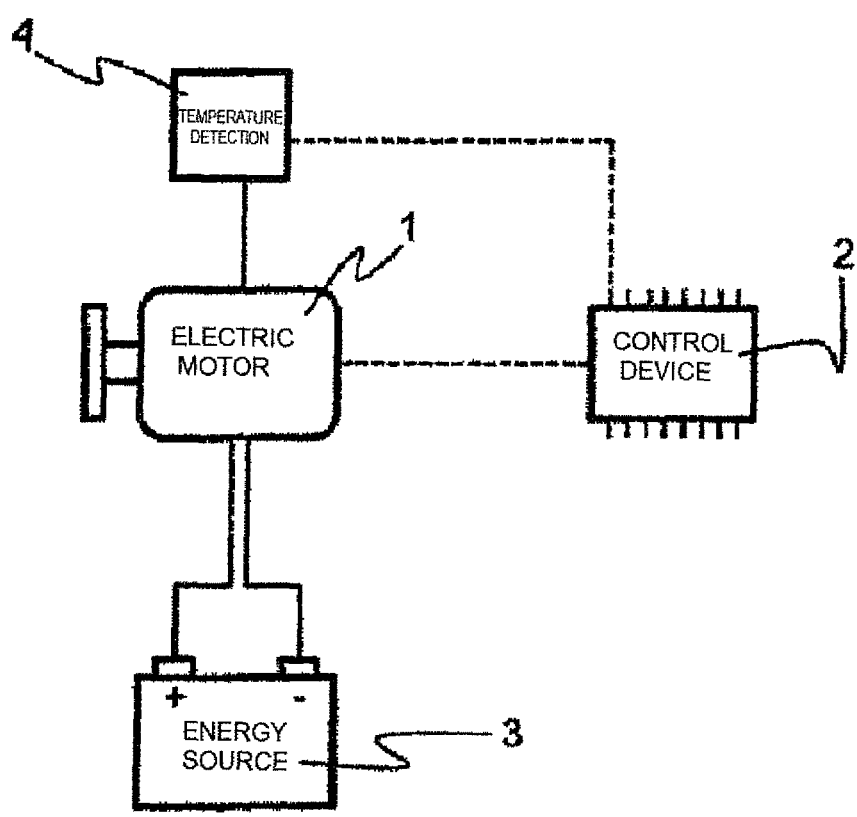

METHOD AND DEVICE FOR TEMPERATURE-DEPENDENT CONTROL OF AN ELECTRIC MOTOR

CROSS-REFERENCES TO RELATED APPLICATIONS

This application is the U.S. National Stage of International Application No. PCT/EP2012/004871, filed Nov. 24, 2012, which designated the United States and has been published as International Publication No. WO 2013/087150 A2 and which claims the priority of German Patent Application, Serial No. 10 2011 121 272.1, filed Dec. 15, 2011, pursuant to 35 U.S.C. 119(a)-(d).

BACKGROUND OF THE INVENTION

The present invention relates to a method and a device for temperature-dependent control of an electric motor, comprising an electric motor which derives electric energy from an energy source for outputting mechanical power, a control device for adjusting the power output of the electric motor and means for detecting the temperature of a component of the electric motor, wherein at a temperature of the component above a temperature threshold the control device reduces the power of the electric motor.

Such methods and devices as for example disclosed in DE 102 03 051 A1 or DE 10 2005 050 741 A1 are used in electric motors for protecting components against overheating. On one hand the electric motor can heat up in a hot environment (external heating) and on the other hand during the conversion of electric and mechanical energy (self-heating). So far the conventional approaches for avoiding heat-related damage provide for temporarily reducing the power of the electric motor (so-called derating). However, these approaches can only counteract the cause for the self-heating. Therefore such methods and devices are only used in temperature ranges, which the electric motor can only reach due to self-heating, wherein this temperature range is so high that it cannot be reached by external heating. The electric motors have to be constructed correspondingly robust with regard to heat damage. This applies particularly to the used magnets, which have to be provided with very expensive additives from the group of rare earths for protection against demagnetization resulting from high temperatures.

The category defining DE 10 2005 052 745 A1 discloses a system and method for estimating the motor temperature for protection against overuse of the motor, wherein an estimated temperature of the motor is determined based on the ambient temperature, a current supplied to the motor, a time during which the current is supplied to the motor and at least one thermal property. The estimated motor temperature is used for reducing a voltage supplied to the motor when the estimated motor temperature is greater than a safe operating temperature of the motor. The voltage is increased again when the estimated motor temperature returns to a degree that is not greater than the safe operating temperature of the motor. A disadvantage is that also in this case the power reduction is not adjusted to the actual cause of the increase of the motor temperature. As a consequence the power of the motor may be reduced unnecessarily in a hot environment in addition the components, in particular the magnets, still have to be constructed expensively to withstand high temperatures.

SUMMARY OF THE INVENTION

An object of the present invention is therefore to provide a method and a device which enables a temperature-dependent control of a cost-effectively producible electric motor, and which ensures a safe operation of the electric motor at a most constant high power output.

This object is solved as a method by a method for temperature-dependent control of an electric motor including setting a power output of the electric motor; detecting a temperature of a component of the electric motor; distinguishing between self-heating and external heating when the temperature of the component changes; and counteracting the self-heating by reducing the power of the electric motor. The object is solved as device by a device which includes means for detecting a temperature of a component of the electric motor, said means being configured to determine whether the electric motor is heated as a result of a self-heating or external heating; and a control device for adjusting a power output of the electric motor, said control device being configured to reduce the power output of the electric motor when the temperature of the component is above a threshold temperature only when the means determine that the electric motor is heated as a result of self-heating.

According to another aspect of the invention a vehicle includes the device according to the invention for temperature-dependent control of the electric.

A method for temperature-dependent control of the electric motor comprises the following steps:
- adjusting the power output of the electric motor;
- detecting a temperature of the component of the electric motor;
- differentiating between self-heating and external heating in case of a change of the temperature of the component;
- counteracting the self-heating by reducing the power of the electric motor.

As a result of differentiating between self-heating, i.e., a temperature change due to power uptake and power output of the electric motor, and an external heating, i.e., a temperature change due to external influences, and by only counteracting the self-heating by reducing the power (derating), the power is reduced in a more targeted manner. As a result, the full power output of the electric motor is available over a longer period of time, thus obviating a thermally robust and thus expensive construction of the electric motor and in particular the permanent magnets.

In a preferred embodiment of the method the power reduction occurs in case of a self-heating above a self-heating threshold. Because the self-heating can technically never be fully avoided during operation of the electric motor, power reduction only occurs when reaching a self-heating threshold. Multiple thresholds can also be provided in a cascading manner so that the power reduction occurs stepwise. On the other hand, when the self-heating falls below the self-heating threshold again the power reduction can be canceled and full power output restored again. The self-heating and self-heating threshold can be expressed in absolute temperature values or as increase rates.

In a preferred embodiment of the method the differentiation occurs by way of a change of the temperature of the component over time. Self-heating and external heating follow defined patterns. In a particularly preferred embodiment, external heating is determined to exist when the temperature of the component changes steadily and/or slowly and self-heating is determined to exist when the temperature of the component changes unsteadily and/or rapidly. The external heating, which essentially results from the ambient temperature, acts constantly and usually only changes very slowly. Correspondingly the temperature course usually appears flat and steady. On the other hand, self-heating occurs when the electric motor takes up power from the energy source and consequently outputs power via it's drive, which usually only occurs for a defined period of time and in the case of alternating loads. For this reason the temperature course in this case usually appears more wavy and steeper. When the temperature course of the external heating is superimposed with the course of the self-heating, the control device can react in a targeted manner based on the characteristic courses by way of reduction of power.

In a preferred embodiment of the method, the differentiation occurs based on the power output during a change of the temperature of the component. In a particularly preferred embodiment self-heating is determined to exist when the temperature of the component changes while the power output is above a power threshold value, and an external heating is determined to exist when the temperature changes while the power output is below the power threshold value. When the temperature of the component changes even though the electric motor does not take up or outputs power or only takes up or outputs a small amount of power practically no self-heating can exist. On the other hand, when the temperature of the component changes during a high uptake of power or output of power this indicates a self-heating. Of course multiple power threshold values can be provided in a cascading manner in order to render the differentiation more accurate.

Device for temperature-dependent control of the electric motor including an electric motor which derives energy from an energy source for outputting mechanical power, a control device for adjusting the power output of the electric motor and means for detecting the temperature of a component of the electric motor, wherein in the case of a temperature of the component above a temperature threshold, the power of the electric motor is reduced by the control device, and wherein the means for detecting the temperature differentiate between a self-heating and an external heating, wherein the control device only counteracts the self-heating by reducing the power.

The energy source can be configured as battery, in particular as accumulator or as generator for example as alternator of a vehicle. The energy source gives off electric current to the electric motor, whereby the electric motor in turn outputs mechanical power to its drive. The power uptake and power output of the electric motor is determined by the control device. The means for temperature detection measure an actual temperature of at least one component of the electric motor and from this are capable of establishing a temporal temperature course. The means for temperature detection have logical algorithms which enable differentiation between self-heating and external heating based on the measured data. Because only the self-heating is causally counteracted by reducing the power, the availability of the power at the electric motor can be maximized without requiring expensive configuration to high temperatures.

In a preferred embodiment of the device, the control device lowers the power in case of a heating up above an self-heating threshold.

In a preferred embodiment of the device, the means for temperature detection differentiate between the self-heating and the external heating by way of a change of the temperature of the component over time.

In a preferred embodiment of the device, the means for temperature detection detect a steady and/or slow change of the temperature of the component as external heating and an unsteady and/or fast change of the temperature of the component as self-heating.

In a preferred embodiment of the device, the means for temperature detection differentiate between the self-heating and the external heating by way of the power output during a change of the temperature of the component.

In a preferred embodiment of the device, the means for temperature detection detect a change of the component temperature while the power output is above a power threshold value as self-heating and a change of the component temperature while the power output is below the power threshold value as external heating.

A vehicle includes the device according to the invention for temperature-dependent control of an electric motor, wherein in a preferred embodiment the electric motor is configured as a servomotor for a steering. The servomotor, which is arranged in a motor space of the vehicle, is exposed to an external heating by the further installed aggregates, in particular by the drive motor of the vehicle. However, the servomotor only outputs power when the steering is actuated, thereby generating self-heat. The device according to the invention in this case can maintain the average power output of the servomotor at a highest possible level by targeted reduction of the power in the case of self-heating.

BRIEF DESCRIPTION OF THE DRAWING

Further details and advantages of the invention become apparent from the following description of a preferred exemplary embodiment with reference to the drawing.

The FIGURE shows a schematic view of a device for temperature-dependent control of an electric motor.

DETAILED DESCRIPTION OF PREFERRED EMBODIMENTS

According to the FIGURE, a device for temperature-dependent control of the electric motor 1 has an energy source 3, preferably in the form of a battery or an accumulator, which supplies the electric motor 1 with electric energy. The electric motor 1 converts the electric energy into mechanical power, and outputs the mechanical power outputs via its output. The power output of the electric motor 1 is controlled by a control device 2. Means for temperature detection 4 of a temperature of a component of the electric motor 1 are assigned to the electric motor 1. The means for temperature detection 4 can distinguish between a self-heating, i.e., a temperature change due to power uptake from the energy source 3 and power output of the electric motor 1, and an external heating, i.e., a temperature change due to external influences. The self-heating is characterized by fast and unsteady temperature change over time, wherein a high power output can also occur during the positive temperature change. The external heating on the other hand is characterized by a steady slow temperature change over time, wherein during the positive temperature change no or only a small power output can occur. When the means for temperature detection 4 recognize a heating up above a defined self-heating threshold, the power output of the electric motor 1 is reduced (stepwise), until the self-heating falls below the self-heating threshold. For the self-heating and self-heating threshold either absolute temperature values or increase rates of the temperatures can be used.

The invention claimed is:

1. A method for temperature-dependent control of an electric motor, comprising:
providing an electric motor;
setting a power output of the electric motor;

detecting a temperature of a component of the electric motor by temperature detection means constructed for detecting a temperature;

distinguishing by the temperature detection means between a self-heating, which is a temperature change due to power intake of the electric motor from an energy source and the power output of the electric motor, and an external heating of the electric motor when the temperature of the component changes essentially resulting from ambient temperature;

determining the external heating to be present when the component temperature changes steadily and/or slowly and determining the self-heating to be present when the component temperature changes unsteadily and/or rapidly;

recognizing by the temperature detection means when the self-heating of the electric motor is above a self-heating threshold; and counteracting the self-heating by reducing the power of the electric motor only when the temperature-detection means recognized that the self-heating of the electric motor is above the self-heating threshold without taking into account the external heating essentially resulting from ambient temperature.

2. The method of claim 1, wherein the distinguishing between the self-heating and the external heating is a function of a change of the temperature of the component over time.

3. The method of claim 1, wherein the distinguishing between the self-heating and the external heating is a function of the power output of the electric motor during a change of the temperature of the component.

4. The method of claim 3, wherein the self-heating is determined when the component temperature changes while the power output is above a power-output threshold, and the external heating is determined when the component temperature changes while the power output is below the power-output threshold.

5. A device, comprising:
an electric motor drawing electric energy from an energy source for a mechanical power output;
a detector constructed to ascertain a temperature of a component of the electric motor and to distinguish between a heating of the electric motor as a result of a self-heating which is a temperature change due to power intake of the electric motor from an energy source and the power output of the electric motor, or external heating when the temperature of the component changes essentially resulting from ambient temperature, with the external heating being determined to be present when the component temperature changes steadily and/or slowly and the self-heating being determined to be present when the component temperature changes unsteadily and/or rapidly; and
a control device configured to counteract an increase in the temperature by reducing the power output of the electric motor only when the detector ascertains that the temperature of the component is above a threshold temperature and the increase in the temperature is caused by self-heating and to reduce the power output of the electric motor when the electric motor heats up above a self-heating threshold without taking into account the external heating essentially resulting from ambient temperature.

6. The device according to claim 5, wherein the detector is configured to distinguish between the self-heating and the external heating based on a change of the temperature of the component over time.

7. The device of claim 5, wherein the detector is configured to differentiate between the self-heating and the external heating based on the power output during a change of the temperature of the component.

8. The device of claim 7, wherein the detector is configured to recognize a change of the temperature of the component while the power output is above a power threshold value as self-heating of the electric motor and to recognize a change of the temperature of the component while the power output is below the power threshold value as external heating of the electric motor.

9. A vehicle, comprising:
an electric motor drawing electric energy from an energy source for a mechanical power output; and
a device for temperature-dependent control of the electric motor, said device comprising a detector constructed to ascertain a temperature of a component of the electric motor and to distinguish between a heating of the electric motor as a result of a self-heating which is a temperature change due to power intake of the electric motor from an energy source and the power output of the electric motor, or external heating when the temperature of the component changes essentially resulting from ambient temperature, with the external heating being determined to be present when the component temperature changes steadily and/or slowly and the self-heating being determined to be present when the component temperature changes unsteadily and/or rapidly; and a control device configured to counteract an increase in the temperature by reducing the power output of the electric motor only when the detector ascertains that the temperature of the component is above a threshold temperature and the increase in the temperature is caused by self-heating and to reduce the power output of the electric motor when the electric motor heats up above a self-heating threshold without taking into account the external heating essentially resulting from ambient temperature.

10. The vehicle of claim 9 wherein the electric motor is constructed as a servomotor for a steering.

* * * * *